United States Patent
Renau

(10) Patent No.: US 7,202,449 B1
(45) Date of Patent: Apr. 10, 2007

(54) BREWING MACHINE POWER MANAGEMENT SYSTEM AND METHOD

(75) Inventor: Karol Renau, Calabasas, CA (US)

(73) Assignee: Renau Corporation, Chatsworth, CA (US)

( * ) Notice: Subject to any disclaimer, the term of this patent is extended or adjusted under 35 U.S.C. 154(b) by 232 days.

(21) Appl. No.: 10/811,061

(22) Filed: Mar. 25, 2004

(51) Int. Cl.
*H05B 1/02* (2006.01)

(52) U.S. Cl. ............... 219/481; 219/485; 219/486; 219/501; 307/41

(58) Field of Classification Search ........ 219/483–486, 219/481, 494, 497, 501, 506, 411–414; 307/41, 307/38–40
See application file for complete search history.

(56) References Cited

U.S. PATENT DOCUMENTS

| | | | | | |
|---|---|---|---|---|---|
| 4,158,330 | A | * | 6/1979 | Vitous | 99/295 |
| 4,282,422 | A | * | 8/1981 | Payne et al. | 219/486 |
| 4,292,502 | A | * | 9/1981 | Adams | 219/483 |
| 4,871,089 | A | * | 10/1989 | Rader et al. | 222/54 |
| 6,543,335 | B1 | * | 4/2003 | Lassota | 99/283 |

* cited by examiner

*Primary Examiner*—Mark Paschall
(74) *Attorney, Agent, or Firm*—Fulwider Patton LLP

(57) ABSTRACT

A power management system for managing the power supplied to a plurality of warming elements in a brewing machine, so as to conform to pre-set power safety requirements.

6 Claims, 1 Drawing Sheet

BREWING MACHINE POWER MANAGEMENT SYSTEM AND METHOD

BACKGROUND OF THE INVENTION

1. Field of the Invention

The present invention relates generally to managing the power supplied to a brewing machine, and, more particularly, relates to a system for managing brewing machine power so as to conform to pre-set operating power safety limits.

2. Description of the Related Art

A device such as a brewing machine includes multiple operating elements, each requiring power to enable operation thereof. The operating elements include multiple warming elements, for warming multiple brewed fluids. The power requirements of the operating elements in the brewing machine must function within pre-set power safety limits, for enabling the safe operation thereof.

It is desirable and necessary to enable the safe operation of the operating elements of the brewing machine within the pre-set power safety limits.

Therefore, there has existed a need for a system which is capable of managing the safe operation of the operating elements of the brewing machine in accordance with the pre-set power safety requirements. The present invention fulfills these needs.

SUMMARY OF THE INVENTION

Briefly, and in general terms, the present invention provides a system for managing the power supplied to a brewing machine within a pre-set operating power safety limit, wherein the brewing machine includes a plurality of operating elements, each of which requires power for the operation thereof. The system includes a processing element, for processing and managing the power requirements of the operating elements of the brewing machine within the pre-set power safety limit.

Other features and advantages will become apparent from the following detailed description, taken in conjunction with the accompanying drawings, which describe and illustrate, by way of example, the features of the invention.

DETAILED DESCRIPTION OF THE PREFERRED EMBODIMENTS

Figure 1:
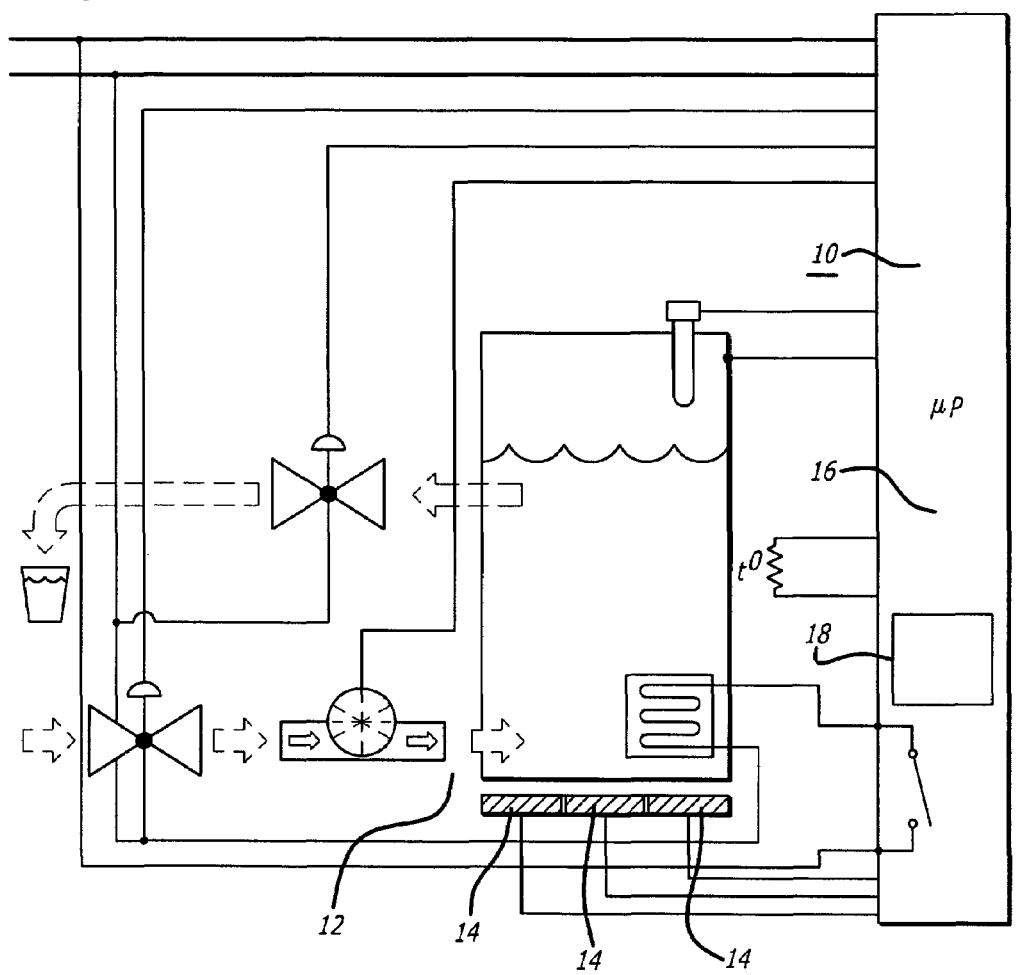
FIG. 1 is an elevational partly-schematic view of a brewing machine which includes a power management system in accordance with the present invention.
Figure 2:
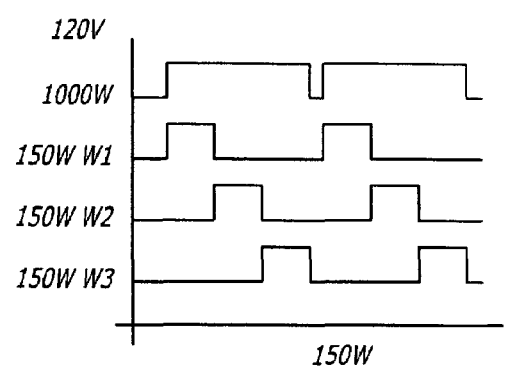
FIG. 2 is a graph of a multiple warming elements power management system in accordance with the present invention.

Referring to the drawings, and in particular to FIGS. 1–2, there is shown a system 10 for managing the power supplied to a brewing machine 12 within a pre-set operating power safety limit. The brewing machine 12 includes a plurality of operating elements 14, each of which requires power for the operation thereof. The operating elements 14 of the brewing machine include a plurality of warming elements. The system 10 includes a processing element 16, for processing and managing the power requirements of the operating elements 14 of the brewing machine 12 within the pre-set power safety limit. The processing element 16 includes a software module 18 for processing and managing the power requirements of the brewing machine 12. The processing element 16 comprises a microprocessor.

The software module 18 includes a power cycling routine. The power cycling routine comprises increasing the power supplied to one of the plurality of warming elements 14 for a period of time, while not supplying power to a remaining other of the plurality of warming elements 14, then terminating the power supplied to the one warming element 14 and increasing the power supplied to another of the plurality of warming elements 14, while not supplying power to the remaining other 14 of the plurality of warming elements. In the system, 10 increasing the power supplied to a warming element 14 enables the warming element 14 to reach a warming temperature substantially rapidly.

As illustrated in FIGS. 1–2, in a method for use of the system, the power requirements of the operating elements 14 of the brewing machine 12 are processed and managed within the pre-set power safety limit, in the processing element 16. Processing and managing includes processing and managing the power requirements of the brewing machine 12 in the software module 18, and comprises processing and managing the power requirements of the plurality of warming elements 14, in the microprocessor 16.

Processing and managing also comprises processing and managing the power requirements of the brewing machine 12 in the power cycling routine, comprising increasing the power supplied to one of the plurality of warming elements 14 for a period of time while not supplying power to a remaining other of the plurality of warming elements 14, then terminating the power supplied to another of the plurality of warming elements 14, while not supplying power to the remaining other of the plurality of warming elements 14, in the power cycling routine. Increasing the power includes increasing the power supplied to a warming element 14 and enabling the warming element 14 to reach the warming temperature substantially rapidly.

From the foregoing it will be appreciated that the system of the present invention provides advantages in managing the power supplied to a brewing machine within a pre-set power safety limit. While several particular forms of the invention have been illustrated and described, it will be apparent that various modification can be made without departing from the spirit and scope of the invention. Accordingly, the invention is not to be limited, except as by the following claims.

What is claimed is:

1. A system for enabling rapid recovery of a pre-brewing warming temperature in preparation for heating in a brewing cycle, and for managing the power supplied to a brewing machine within a pre-set operating power safety limit, comprising:

a brewing machine, including a tank for containing a fluid which is able to fill the tank, to be warmed in preparation for heating in the brewing process, heated in the brewing process, dispensed, refilled, and to be re-warmed for rapid recovery of warming fluid in preparation for heating in the brewing process, and a plurality of operating elements, each of which requires power for the operation thereof, comprising a plurality of warming elements;

a processing element, for processing and managing the power requirements of the operating elements of the brewing machine within the pre-set power safety limit, including a software module for processing and managing the power requirements of the brewing machine, which includes a power cycling routine, which comprises increasing the power supplied to one of the plurality of warming elements for a period of time, while not supplying power to a remaining other of the plurality of warming elements, then terminating the power supplied to the one warming element and increasing the power supplied to another of the plurality of warming elements, while not supplying power to the remaining other of the plurality of warming elements, wherein increasing the power supplied to a warming element enables the warming element to reach a warming temperature substantially rapidly, to enable rapid recovery of a pre-brewing warming temperature in preparation for heating in a brewing cycle.

2. The system of claim 1, wherein the operating elements of the brewing machine include a plurality of warming elements.

3. The system of claim 1, wherein the processing element comprises a microprocessor.

4. A method of enabling rapid recovery of a pre-brewing warming temperature in preparation for heating in a brewing cycle, and of managing the power supplied to a brewing machine within a pre-set operating power safety limit, in a system which comprises a brewing machine, including a tank for containing a fluid which is able to fill the tank, to be warmed in preparation for heating in the brewing process, heated in the brewing process, dispensed, refilled, and to be re-warmed for rapid recovery of warming fluid in preparation for heating in the brewing process, and a plurality of operating elements, each of which requires power for the operation thereof, comprising a plurality of warming elements a processing element, for processing and managing the power requirements of the operating elements of the brewing machine within the pre-set power safety limit, including a software module for processing and managing the power requirements of the brewing machine, which includes a power cycling routine, which comprises increasing the power supplied to one of the plurality of warming elements for a period of time, while not supplying power to a remaining other of the plurality of warming elements, then terminating the power supplied to the one warming element and increasing the power supplied to another of the plurality of warming elements, while not supplying power to the remaining other of the plurality of warming elements, wherein increasing the power supplied to a warming element enables the warming element to reach a warming temperature substantially rapidly, to enable rapid recovery of a pre-brewing warming temperature in preparation for heating in a brewing cycle wherein the method comprises:

enabling rapid recovery of a pre-brewing warming temperature in preparation for heating in a brewing cycle, in the plurality of warming elements; and processing and managing the power requirements of the operating elements of the brewing machine within the pre-set power safety limit, in the processing element.

5. The method of claim 4, wherein the operating elements of the brewing machine include a plurality of warming elements, and wherein processing and managing comprises processing and managing the power requirements of the plurality of warming elements.

6. The method of claim 4, wherein the processing element comprises a microprocessor, and wherein processing and managing comprises processing and managing in the microprocessor.

\* \* \* \* \*